(12) United States Patent
Ahles et al.

(10) Patent No.: US 7,937,299 B1
(45) Date of Patent: May 3, 2011

(54) SYSTEMS AND METHODS FOR PREAUTHORIZING CHECK TRANSACTIONS

(75) Inventors: Daniel Ahles, Houston, TX (US); Mark Wallin, Sugar Land, TX (US)

(73) Assignee: First Data Corporation, Greenwood Village, CO (US)

( * ) Notice: Subject to any disclaimer, the term of this patent is extended or adjusted under 35 U.S.C. 154(b) by 795 days.

(21) Appl. No.: 11/321,719

(22) Filed: Dec. 29, 2005

(51) Int. Cl.
*G07B 17/00* (2006.01)
*G07F 19/00* (2006.01)
(52) U.S. Cl. ......................................... 705/30
(58) Field of Classification Search ............... 705/38, 705/45, 37, 1, 1.1
See application file for complete search history.

(56) References Cited

U.S. PATENT DOCUMENTS

| | | | |
|---|---|---|---|
| 5,093,787 A * | 3/1992 | Simmons | 705/33 |
| 5,679,938 A | 10/1997 | Templeton et al. | |
| 5,679,940 A | 10/1997 | Templeton et al. | |
| 5,930,777 A | 7/1999 | Barber | |
| 6,505,772 B1 | 1/2003 | Mollett et al. | |
| 6,547,132 B1 | 4/2003 | Templeton et al. | |
| 6,581,043 B1 | 6/2003 | Wallin et al. | |
| 2002/0099651 A1 * | 7/2002 | May | 705/38 |
| 2003/0033252 A1 * | 2/2003 | Buttridge et al. | 705/45 |
| 2003/0093368 A1 | 5/2003 | Manfre et al. | |
| 2003/0130919 A1 | 7/2003 | Templeton et al. | |
| 2003/0216987 A1 | 11/2003 | Mollett et al. | |
| 2003/0216988 A1 | 11/2003 | Mollett et al. | |
| 2003/0217014 A1 | 11/2003 | Mollett et al. | |
| 2003/0225686 A1 | 12/2003 | Mollett et al. | |
| 2006/0015428 A1 * | 1/2006 | Friedman | 705/35 |
| 2006/0206350 A1 * | 9/2006 | Edwards et al. | 705/1 |

FOREIGN PATENT DOCUMENTS

| | | |
|---|---|---|
| WO | WO 01/97134 A1 | 12/2001 |
| WO | WO 03/042790 A2 | 5/2003 |
| WO | WO 03/083751 A1 | 10/2003 |

OTHER PUBLICATIONS

Business Wire. "Intelli-check Partners with Ultra-Scan to Integrate Ultrasonic Fingerprint Technology into ID-CHECK Document Verification System" Jul. 1, 2004.*

* cited by examiner

*Primary Examiner* — Matthew S Gart
*Assistant Examiner* — Oluseye Iwarere
(74) *Attorney, Agent, or Firm* — Sutherland Asbill & Brennan LLP

(57) ABSTRACT

Systems and methods for performing preauthorization of check transactions are disclosed. In some check transactions such as ACH card transactions, the actual purchase amount is not known when the card is first presented to a merchant. Dispensing of gasoline for a fill-up is an example of such a transaction. Various embodiments of the systems and methods disclose preauthorizing such transaction before the actual purchase amount is known, and without placing a hold of the checking account corresponding to the card. In one embodiment, such preauthorization can be based on, for example, a likely purchase amount associated with the merchant. The actual amount, once determined, can be matched with the information used for preauthorization in various manners.

40 Claims, 7 Drawing Sheets

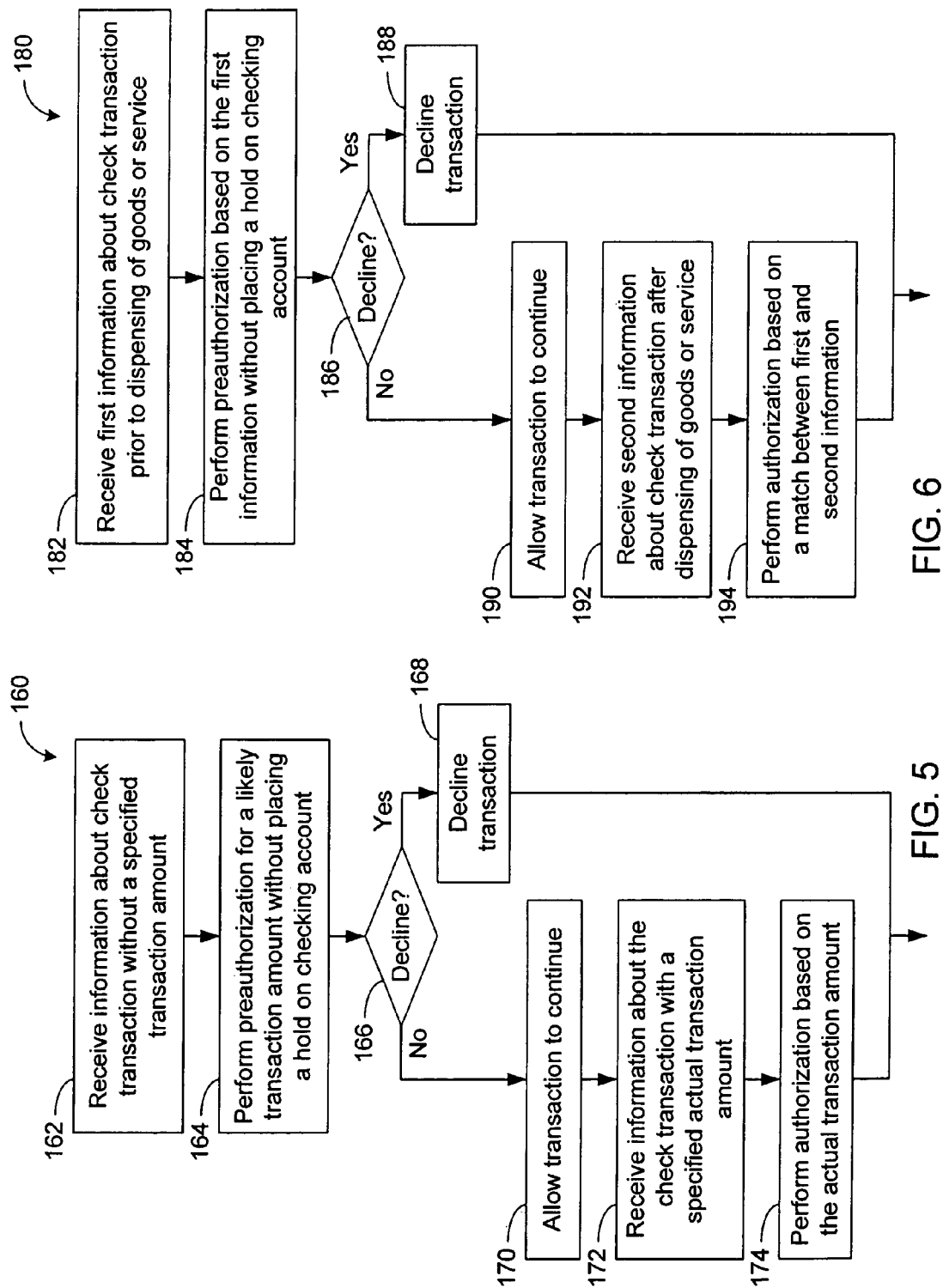

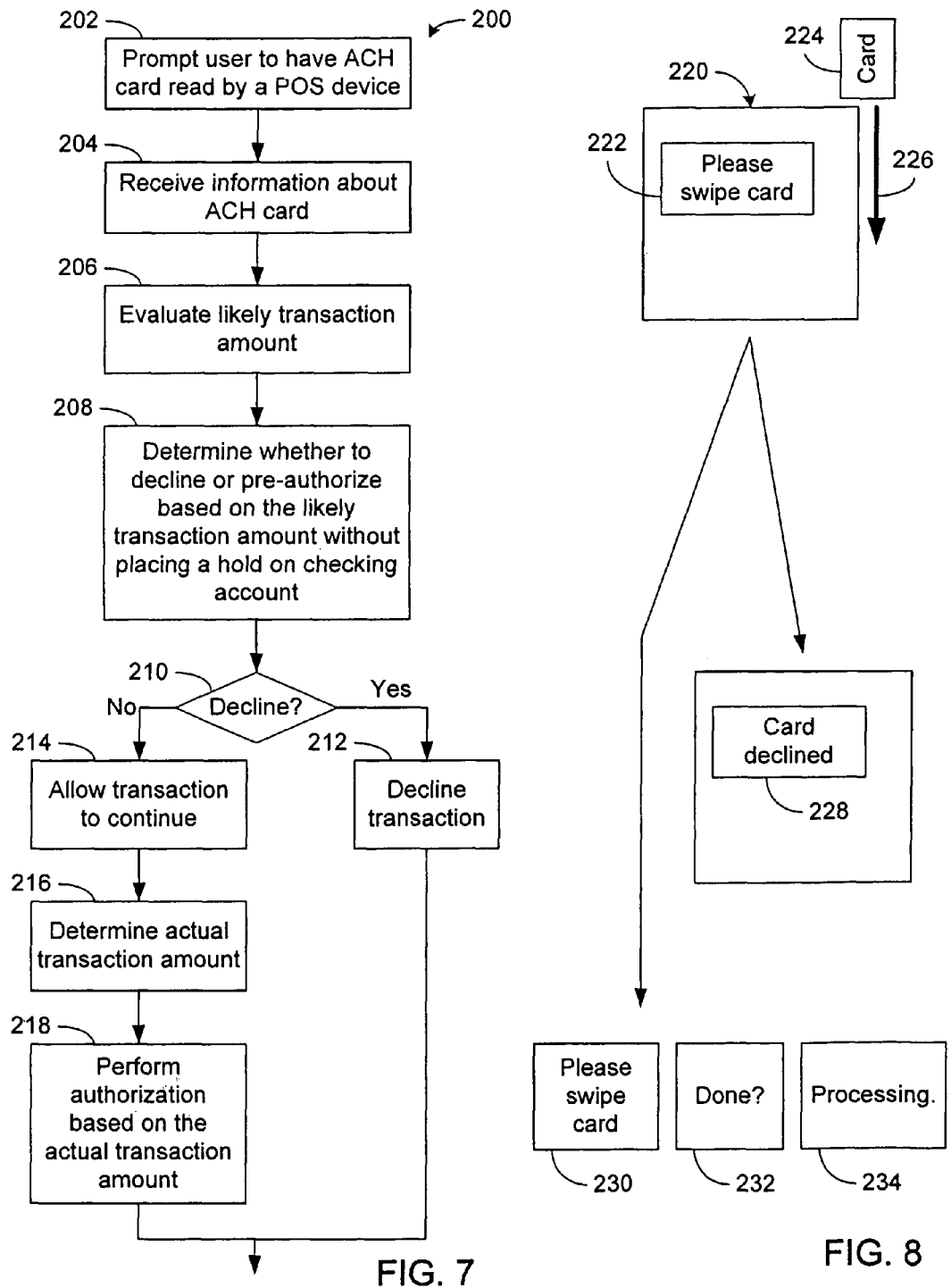

SYSTEMS AND METHODS FOR PREAUTHORIZING CHECK TRANSACTIONS

BACKGROUND

1. Field

The present disclosure generally relates to the field of financial transactions, and more particularly, to systems and methods for preauthorizing check transactions.

2. Description of the Related Art

Many financial transactions involve situations where the actual purchase amount is not known in advance. For example, when filling up at a gas station, the total volume (and thus the cost) is usually not known. In such a situation, it is common for the merchant to require some form of payment verification before dispensing of goods or service.

Cash, credit card, and debit card are examples of forms of payment where certain amount of fund is held until the actual purchase amount is determined and processed. Cash can be held by the gas station attendant until the filling is complete. Credit card, for some amount, can be held from the credit card account's line of credit. Debit card, for some amount, can be held from the available funds in the corresponding account.

Many merchants that offer various payment options also subscribe to a financial transaction processing service. Such a service typically receives information about a given transaction, and determines whether the transaction should be authorized or declined. Generally, merchants and customers typically want the service to process financial transactions quickly. For merchants and the check processing service, such desire for quick processing needs to be balanced with concerns about factors such as likelihood that the transaction will be successful.

SUMMARY

The foregoing needs can be addressed by systems and methods configured to perform preauthorization of check transactions. In some check transactions such as ACH card transactions, the actual purchase amount is not known when the card is first presented to a merchant. Dispensing of gasoline for a fill-up is an example of such a transaction. Various embodiments of the systems and methods disclose preauthorizing such transaction before the actual purchase amount is known, and without placing a hold of the checking account corresponding to the card. In some embodiments, such pre-authorization can be based in part on, for example, a likely purchase amount associated with the merchant. The actual amount, once determined, can be matched with the information used for preauthorization in various manners.

One embodiment of the present disclosure relates to a method for processing a financial transaction. The method includes obtaining information about a transaction involving a check-related payment to a merchant in exchange for goods or service. The information does not have an actual transaction amount. The check-related payment is associated with an account from which funds are to be drawn. The method further includes determining a likely transaction amount for the transaction based on the information. The method further includes determining whether to allow the transaction based on the likely transaction amount and without placing a hold on the account for the transaction.

In one embodiment, the check-related payment includes a check payment. In one embodiment, the check payment includes an electronic check payment. In one embodiment, the check-related payment includes a payment using an automated clearing house card. In one embodiment, the information is obtained from a point-of-sale device associated with the merchant.

In one embodiment, the method further includes pre-authorizing the transaction based on the likely transaction amount. In one embodiment, the pre-authorizing includes a risk assessment based on the information and the likely transaction amount.

In one embodiment, the information includes type of goods or service associated with the merchant. In one embodiment, the likely transaction amount is estimated based on the type of goods or service associated with the merchant. In one embodiment, the pre-authorizing is performed prior to dispensing of the goods or service.

In one embodiment, the method further includes obtaining an actual transaction amount. In one embodiment, the actual transaction amount is obtained after dispensing of the goods or service. In one embodiment, the method further includes associating the pre-authorization with the actual transaction amount. In one embodiment, the transaction is authorized for the actual transaction amount if the actual transaction amount is associated with the pre-authorization. In one embodiment, the transaction is authorized for the actual transaction amount if the actual amount is less than or equal to the likely transaction amount. In one embodiment, the transaction is authorized for the actual transaction amount if the actual transaction amount is greater than the likely transaction amount by a selected amount. In one embodiment, the selected amount can be, for example, approximately ten percent of the likely transaction amount.

In one embodiment, the associating includes matching of the information with the actual transaction amount. In one embodiment, the matching is achieved when the actual transaction amount is obtained during a communication with the merchant after obtaining of the information. In one embodiment, the matching is achieved when the actual transaction amount is obtained within a predetermined amount of time after obtaining of the information.

In one embodiment, the method further includes interacting with the account so as to effectuate the check-related payment for the actual transaction amount. In one embodiment, the interaction with the account occurs in batch along with other similar financial transactions.

Another embodiment of the present disclosure relates to a system for processing a financial transaction. The system includes an interface component configured to obtain information about a transaction involving a check-related payment to a merchant in exchange for goods or service. The information does not have an actual transaction amount. The check-related payment is associated with an account from which funds are to be drawn. The system further includes a processor configured to determine a likely transaction amount for the transaction based on the information. The processor is further configured to determine whether to allow the transaction based on the likely transaction amount, and optionally on the evaluation of other risk factors, and without placing a hold on the account for the transaction.

In one embodiment, the check-related payment includes a check payment. In one embodiment, the check payment includes an electronic check payment. In one embodiment, the check-related payment includes a payment using an automated clearing house card. In one embodiment, the information is obtained from a point-of-sale device associated with the merchant.

In one embodiment, the processor is further configured to pre-authorize the transaction based on the likely transaction amount. In one embodiment, the pre-authorization includes a risk assessment based on the information and the likely transaction amount. In one embodiment, the information includes type of goods or service associated with the merchant. In one embodiment, the likely transaction amount is estimated based on the type of goods or service associated with the merchant. In one embodiment, the pre-authorization is performed prior to dispensing of the goods or service.

In one embodiment, the interface component is further configured to obtain an actual transaction amount. In one embodiment, the actual transaction amount is obtained after dispensing of the goods or service.

In one embodiment, the processor is further configured to associate the pre-authorization with the actual transaction amount. In one embodiment, the transaction is authorized for the actual transaction amount if the actual transaction amount is associated with the pre-authorization. In one embodiment, the transaction is authorized for the actual transaction amount if the actual amount is less than or equal to the likely transaction amount. In one embodiment, the transaction is authorized for the actual transaction amount if the actual transaction amount is greater than the likely transaction amount by a selected amount. In one embodiment, the selected amount can be, for example, approximately ten percent of the likely transaction amount.

In one embodiment, the association includes a match of the information with the actual transaction amount. In one embodiment, the match is achieved when the actual transaction amount is obtained during a communication with the merchant after obtaining of the information. In one embodiment, the match is achieved when the actual transaction amount is obtained within a predetermined amount of time after obtaining of the information.

In one embodiment, the interface component is further configured to interact with the account so as to effectuate the check-related payment for the actual transaction amount. In one embodiment, the interaction with the account occurs in batch along with other similar financial transactions.

Yet another embodiment of the present disclosure relates to a system for processing a financial transaction. The system includes means for determining a likely transaction amount. The system further includes means for pre-authorizing the transaction based on the likely transaction amount and without placing a hold on an account associated with the financial transaction.

Yet another embodiment of the present disclosure relates to a method for processing a financial transaction. The method includes obtaining information about a transaction involving a check-related payment to a merchant in exchange for goods or service, with the information being obtained prior to dispensing of the goods or service, and with the check-related payment being associated with an account from which funds are to be drawn. The method further includes determining whether to allow the transaction prior to dispensing of the goods or service, based on a transaction amount and without placing a hold on the account for the transaction amount.

BRIEF DESCRIPTION OF THE DRAWINGS

FIG. 5 shows one embodiment of a process configured to perform preauthorization based on a likely purchase amount and without placing a hold on checking account, where the process can further include subsequent operations where the transaction can be authorized based on the actual payment amount;

FIG. 6 shows one embodiment of a process configured to perform preauthorization based on a first information obtained before dispensing of goods or service without placing a hold on checking account, where the process can further include subsequent operations where the transaction can be authorized based on matching of the first information with a second information obtained after dispensing of goods or service;

FIG. 7 shows an example of the process of FIG. 5 involving an ACH card being used for payment;

FIG. 8 shows example interactions that can be implemented during the example process of FIG. 7;

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

The present disclosure generally relates to check-related transactions. In some situations, a check transaction can involve a purchase where the actual purchase amount is indeterminate at the beginning of the transaction. For example, filling up at a gas station typically involves an amount that is not known initially. In another example, the final amount for food and service at a restaurant may not be known initially, because orders may change. Various features of the present disclosure can facilitate determination of whether a given transaction should be allowed to continue when the actual transaction amount is not known. In some embodiments, such determination can be based on a likely amount associated with the transaction. In some embodiments, such determination can be performed without placing a hold on an account corresponding to the transaction. In some embodiments, such determination can be part of a preauthorization performed when a check-related payment is presented to a merchant.

In transactions such as credit card transactions, an authorization can be issued prior to dispensing of goods or service, based on a hold on certain amount of fund from a line of credit established for the credit card holder. Similarly with debit card transactions, an authorization can be issued prior to dispensing of goods or service, based on a hold on certain amount of fund from a corresponding account. Thus, with these example transactions, an initial interaction is required to place a hold on the fund if some form of security is desired prior to dispensing of goods or service.

In some embodiments of the present disclosure, an initial interaction to place a hold on a fund is substantially omitted. To reduce the risk of allowing transactions without such a hold on funds, preauthorization can be performed at the initial stage of the transaction (for example, prior to dispensing of goods or service). If such preauthorization shows that the transaction is too risky, then the transaction can be declined before dispensing of goods or service. If the preauthorization shows that the transaction has an acceptable risk, then the transaction can be permitted to proceed and subsequently processed in various ways.

One can see that by omitting the initial hold step, transactions involving initially indeterminate purchase amounts can be processed in a more flexible manner. For example, because a hold is not placed for a given transaction, that transaction can be approved (thereby allowing the merchant to dispense goods or service) and set aside for later batch processing with clearing houses and/or checking accounts.

Figure 1:
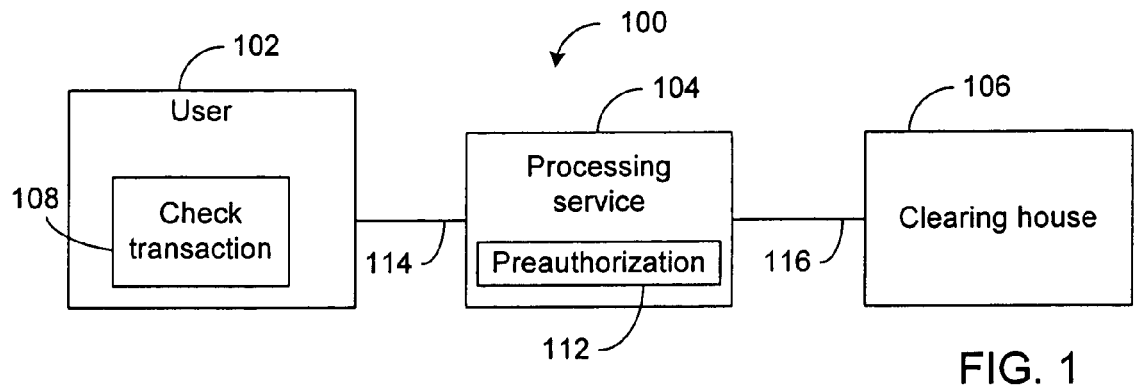
FIG. 1 shows a block diagram of one embodiment of a system configured to allow preauthorization of financial transactions such as a check-related transaction.

FIG. 1 shows a block diagram of one embodiment of a check processing system 100 that includes a check processing service 104 having a communication link 114 with a user 102. The user 102 can be, for example, a merchant who subscribes to the service 104.

As shown in FIG. 1, a check transaction 108 involving the user 102 is shown as being processed by the service 104. In some embodiments, the check processing service 104 includes a preauthorization component 112 that determines whether to allow the transaction without knowing the actual amount of the transaction. In some embodiments, such determination includes preauthorization of the transaction based on a likely amount associated with the transaction. In some embodiments, such determination can be performed without placing a hold on an account corresponding to the check transaction. Examples of factors that can be used to estimate the likely amount are described below in greater detail.

For the purpose of description, a "check transaction" is not limited to a paper check transaction, and can include, by way of examples, an electronic check transaction, an ACH card transaction, and any transaction where the source of fund is a checking account. In the disclosure herein, a "check transaction" is sometimes referred to as a "check-related transaction."

As further shown in FIG. 1, the check processing service 104 can have a communication link 116 with a clearing house 106 such as Automated Clearing House or Federal Clearing House. In some embodiments, processing with the clearing house 106 occurs if the check transaction is ultimately authorized. In some embodiments, the preauthorization process does not involve interaction with the clearing house 106.

Figure 2A:
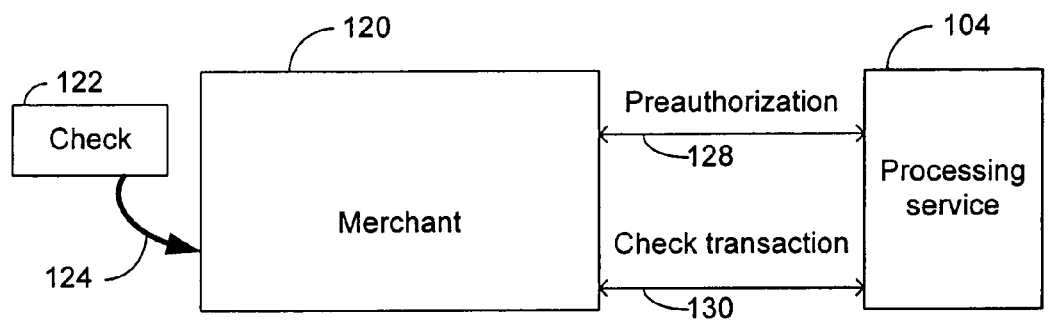
FIG. 2A shows a block diagram of an example check-related transaction, where a check is used for payment to a merchant.

FIG. 2A shows an example of the check transaction of FIG. 1. In one embodiment, a merchant 120 can receive (indicated by an arrow 124) a check 122 as payment for goods or service. Such check transaction can be preauthorized (as indicated by an arrow 128) by the processing service 104. In one embodiment, the merchant 120 can interact with the processing service 104 for other transaction-related matters (indicated by an arrow 130). For example, after the preauthorization and the sale, the merchant 120 can transmit the actual purchase amount in the communication 130.

For the purpose of description, the check 122 can be a paper check provided to the merchant, or an electronic check transaction where information about a check is provided to the merchant. In one embodiment, the check 122 can be processed via a point-of-sale device.

Figure 2B:
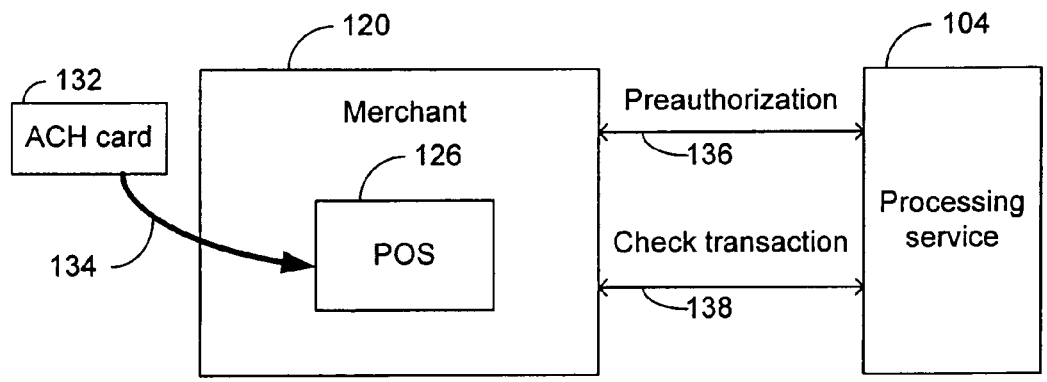
FIG. 2B shows a block diagram of another example check-related transaction, where an ACH (automated clearing house) card is used for payment via a POS (point-of-sale) device associated with a merchant.

FIG. 2b shows another example of the check transaction of FIG. 1. In one embodiment, a merchant 120 can have a point-of-sale (POS) device 126 configured to accept (depicted as an arrow 134) payment involving cards such as an ACH (automated clearing house) card 132. The POS device 126 can also be configured to communicate with the check processing service 104. Such communication can include information relating to preauthorization (depicted as an arrow 136) and other transaction-related matters (depicted as an arrow 138). For example, after the preauthorization and the sale, the POS 126 can transmit the actual purchase amount in the communication 138.

In one embodiment, the preauthorization information (128 in FIG. 2A, and 136 in FIG. 2B) does not include the actual transaction amount. The processing service 104 can perform the preauthorization based on a likely transaction amount.

Figure 3:
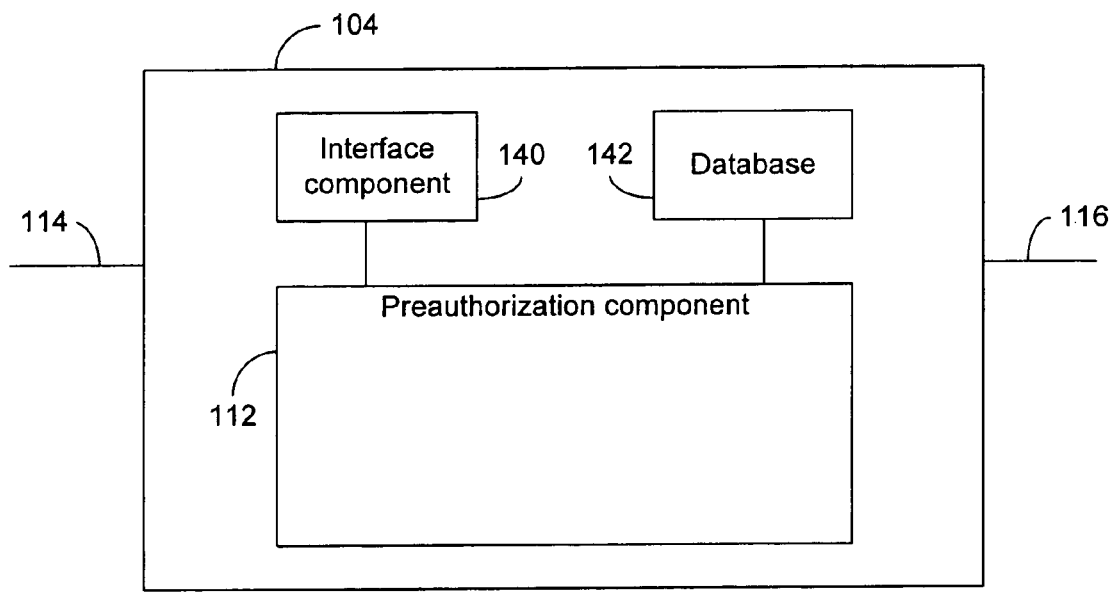
FIG. 3 shows a block diagram of one embodiment of a check processing service having a preauthorization component configured to provide various embodiments of preauthorization of check-related transactions.

FIG. 3 shows a block diagram of the check processing service 104 that can process various check transactions of the present disclosure via the communication link 114. As herein, the service 104 can interact with the clearing house (not shown in FIG. 3) via the communication link 116.

On one embodiment, the check processing service 104 includes the preauthorization component 112 that is functionally linked to an interface component 140 and a database 142. The interface component 140 can facilitate communication with the user (not shown) and/or the clearing house (not shown). In one embodiment, the interface component 140 can facilitate communication with the user to obtain information that can be used to perform the preauthorization. For example, such information can be obtained when a customer or an attendant swipes a card through a POS device prior to dispensing of goods or service. Such information can include a merchant identifier and checking account information that allow estimation of a likely purchase amount.

In one embodiment, the database 142 can facilitate the preauthorization process by, for example, storing information about previous transactions involving the merchant and/or the card. For example, if the merchant is a gas station, then previous transactions can provide some indication (e.g., an average or a range) of a likely purchase amount. In one embodiment, a likely purchase amount can be further refined by also considering previous transactions involving a given card at a given gas station.

In one embodiment, previous transaction information may not be needed to estimate a likely transaction amount. For example, a likely transaction amount may be based simply on the type of commerce the merchant in involved in. So for gas stations, for example, a likely amount of $50 may be assigned, and the preauthorization can be based on that amount.

One can see that there are a number of different ways in which a likely transaction amount can be estimated. Thus, various examples described herein should not be understood as limiting the scope of the present disclosure.

Figure 4:
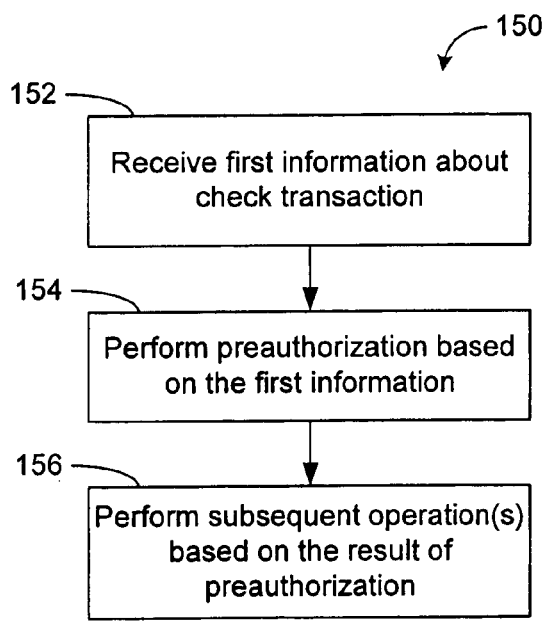
FIG. 4 shows one embodiment of a process configured to perform preauthorization of a check transaction.

FIG. 4 shows one embodiment of a process 150 that can be performed by the check processing service 104 of FIG. 3. In a process block 152, the service receives first information about a check transaction, where the first information does not include an actual transaction amount. In a process block 154, preauthorization is performed based on the first information. In one embodiment, the preauthorization is performed without placing a hold on a fund in an account associated with the check transaction. In one embodiment, the process 150 performs the process blocks 152 and 154 prior to dispensing of goods or service by the merchant.

In a process block 156, the process 150 performs subsequent operation(s) associated with the transaction based on the result of the preauthorization. Such operation(s) can include declining or allowing continuation of the transaction. If the transaction is allowed to continue, such operations can further include obtaining of the actual transaction and authorizing the check transaction for that actual amount.

FIG. 5 shows one embodiment of a process 160 configured to perform preauthorization of a check transaction based on a likely transaction amount. Such transaction, if preauthorized, can be allowed to continue and be processed subsequently based on the actual transaction amount.

In a process block 162, information about a check transaction is received. Typically, such information is transmitted by a merchant at the initial stage of the transaction (for example, prior to dispensing of goods or service). Thus in some embodiments, the information in the process block 162 does not include the actual transaction amount.

In a process block 164, preauthorization is performed for a likely transaction amount without placing a hold on an account (for example, a checking account) for the likely transaction amount. In a decision block 166, the process 160 determines whether the transaction should be declined based on the preauthorization. If the answer is "Yes," the transaction is declined in a process block 168. If the answer is "No," the transaction is allowed to continue in a process block 170.

In a process block 172, information that includes the actual transaction amount is received (for example, after dispensing of the goods or service). In a process block 174, authorization can be performed based on the actual transaction amount. As described herein by way of examples, such authorization based on the actual amount, and following the preauthorization based on the likely amount, can be performed in a number of different ways.

FIG. 6 shows one embodiment of a process 180 configured to perform preauthorization of a check transaction based on information about a check transaction prior to dispensing of goods or service. Such transaction, if preauthorized, can be allowed to continue and be processed subsequently based on information obtained after dispensing of goods or service.

In a process block 182, first information about a check transaction is received prior to dispensing of goods or service by a merchant. In a process block 184, preauthorization is performed based on the first information without placing a hold on an account (for example, a checking account). In a decision block 186, the process 180 determines whether the transaction should be declined based on the preauthorization. If the answer is "Yes," the transaction is declined in a process block 188. If the answer is "No," the transaction is allowed to continue in a process block 190.

In a process block 192, second information about the check transaction is received after dispensing of the goods or service by the merchant. In a process block 194, authorization can be performed based on a match between the first and second information. As described herein by way of examples, such authorization based on the match can be performed in a number of different ways.

FIG. 7 shows one embodiment of an example of the process 160 of FIG. 5, where an ACH card is used as a form of payment. As described herein, ACH transaction is an example of check transactions that can be processed using various features of the present disclosure. Thus, this example should not be understood as limiting the scope of the present disclosure.

FIG. 8 shows example messages that can be displayed on an example POS device 220 to facilitate the check transaction. Again, this example should not be understood as limiting the scope of the present disclosure.

In a process block 202, a user of a POS device is prompted to have the ACH card read. As shown in FIG. 8, the example POS device 220 can display an example message 222 requesting the user to swipe the card. In response, a card 224 is depicted as being swiped (indicated by an arrow 226).

In a process block 204, information about the ACH card is received. In a process block 206, a likely transaction amount is evaluated. In a process block 208, the process 200 determines whether to decline or preauthorize the transaction based on the likely transaction amount without placing a hold on a checking account corresponding to the ACH card.

In a decision block 210, the process 200 determines whether the transaction should be declined. If the answer is "Yes," the transaction is declined in a process block 212. As shown in FIG. 8, an example message 228 can inform the user that the transaction is declined. If the answer is "No," the transaction is allowed to continue in a process block 214.

In a process block 216, the process 200 determines the actual transaction amount (for example, after dispensing of the goods or service). In a process block 218, authorization can be performed based on the actual transaction amount. As shown in FIG. 8, example messages 230, 232, and 234 can request the user for additional actions, or inform the user of the status of the transaction.

The example message 230 requests the user to swipe the card again. The example message 232 requests the user to confirm whether dispensing of goods or service is completed. The example message 234 informs the user that the transaction is being processed. As described herein, authorization based on the actual amount can be performed in a number of different ways. Thus, messages that facilitate such different methods can vary accordingly.

Figure 9:
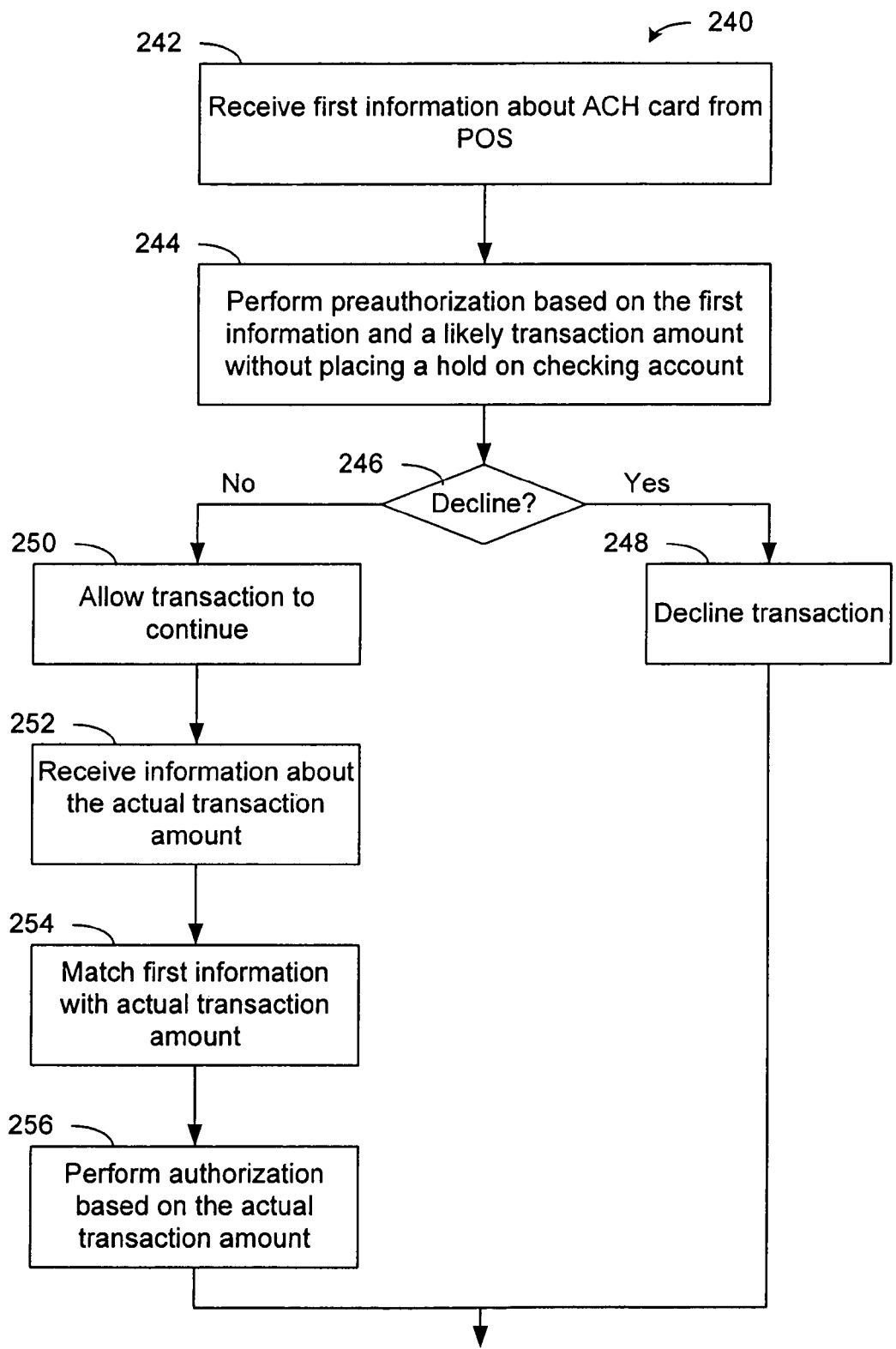
FIG. 9 shows an example of the process of FIG. 6 involving an ACH card being used for payment.

FIG. 9 shows one embodiment of an example of the process 180 of FIG. 6, where an ACH card is used as a form of payment. As described herein, ACH transaction is an example of check transactions that can be processed using various features of the present disclosure. Thus, this example should not be understood as limiting the scope of the present disclosure. Example messages similar to those depicted in FIG. 8 can facilitate the check transaction.

In a process block 242, first information about an ACH card is received from a POS device. In one embodiment, the first information does not include the actual transaction amount. In a process block 244, preauthorization is performed based on the first information and a likely transaction amount, without placing a hold on a checking account corresponding to the ACH card.

In a decision block 246, the process 240 determines whether the transaction should be declined based on the preauthorization of the process block 244. If the answer is "Yes," the transaction is declined in a process block 248. If the answer is "No," the transaction is allowed to continue in a process block 250.

In a process block 252, second information that includes the actual transaction amount is received. In a process block 254, the process 240 performs a match between the first information and the second information. In a process block 256, an authorization is performed based on the actual transaction amount that has been matched with the first information.

Figure 10:
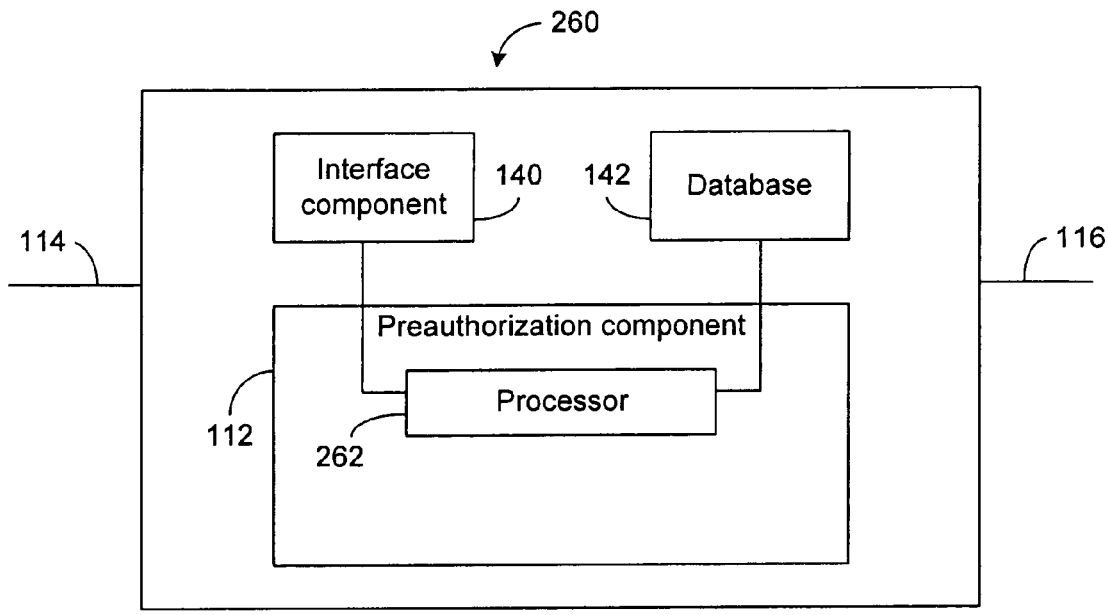
FIG. 10 shows a block diagram of one embodiment of the preauthorization component having a processor configured to facilitate various functionalities of preauthorization of check-related transactions.

FIG. 10 shows a block diagram of an example configuration 260 of the check processing service having the preauthorization component 112. In some embodiments various functionalities of preauthorization, as described herein, can be performed by the preauthorization component 112 in cooperation with the interface component 140 and the database 142. For example, the database 142 can facilitate retrievable storage of information such as types of goods or services associated with different merchants. In one embodiment, the preauthorization component 112 can include a processor 262 that can be configured to coordinate various functionalities involved in preauthorization and/or further processing of check transactions.

Figure 11:
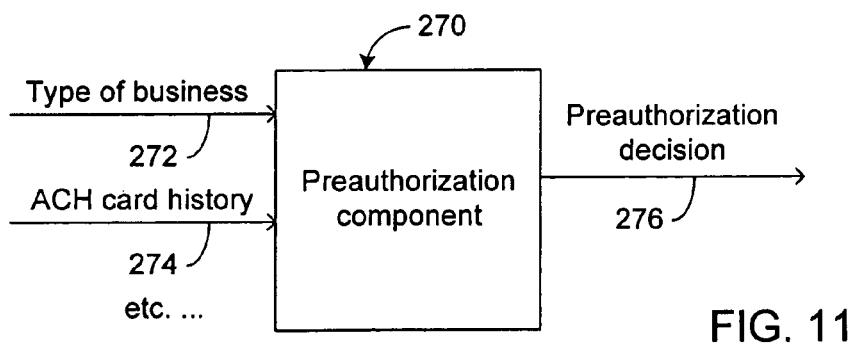
FIG. 11 shows that in one embodiment, one or more factors such as type of merchant's business and/or transaction history can be used in determining a likely purchase amount that is in turn used to determiner whether the transaction should be preauthorized.

FIG. 11 shows one embodiment of a preauthorization component 270 configured to generate a preauthorization decision 276 based on one or more inputs. For example, information 272 having the type of business can be used to facilitate determination of a likely transaction amount. Such information can be obtained, for example, by using a merchant identifier (obtained from a POS, for example) to look up a merchant profile stored in a database.

As shown in FIG. 11, customer information such as card history 274 can also be used to facilitate determination of a likely transaction amount and/or preauthorization based on such amount. For example, a merchant profile can provide a likely amount, and the card use history can be used to determine whether authorizing the card use for that amount would be acceptable.

Based on the foregoing examples, one can see that preauthorization can be based on a number of inputs, either individually or in some combination. In some embodiments, the preauthorization component 270 can be configured to perform or facilitate performance of a risk assessment based on its input(s). Such risk assessment can provide an estimate of a risk associated with the check transaction, thereby allowing the preauthorization component 270 to determine whether or not to allow continuation of the transaction.

Figure 12:
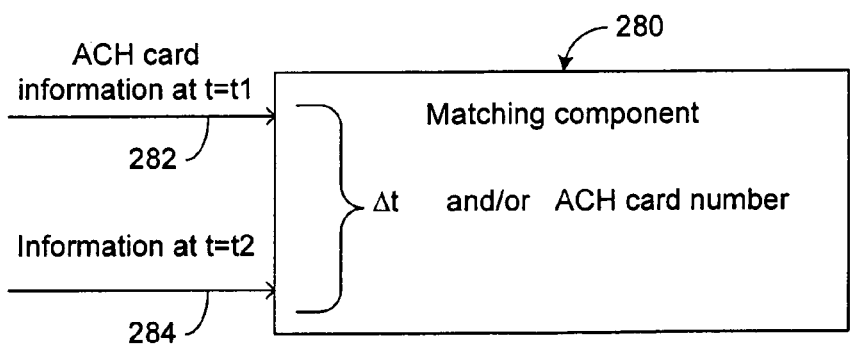
FIG. 12 shows that in one embodiment, preauthorization can be matched with subsequent information received for the transaction in different ways.

FIG. 12 shows that in one embodiment, the check processing service can include a matching component 280 that matches the information used for preauthorization with other information obtained subsequently. In one embodiment, the matching component 280 is part of the preauthorization component 112, and the matching functionality can be facilitated by the processor 262.

An initial information 282 about the transaction (for example, ACH card information) is shown to be received by the matching component 280 at time t=t1. The initial information can be used for preauthorization of the transaction. For the purpose of description of FIG. 12, it will be assumed that the transaction is preauthorized, and the transaction is allowed to continue.

A second information 284 about the transaction is shown to be received by the matching component 280 at time t=t2, such that an elapsed time can be defined as $\Delta t=t2-t1$. There are numerous different ways in how the initial information 282 can be matched with the second information 284. For example, if both sets of information are received from the same POS, matching can be based on the elapsed time $\Delta t=t2-t1$. In the example gas station setting, the initial information can be received when the card is initially swiped at about t1, and the actual purchase price can be received when the nozzle is replaced at about t2. If the elapsed time is within some selected value, the two sets of information can be considered to be a match.

In some situations, elapsed time may not be a suitable parameter for matching. As an example, a restaurant may involve multiple card transactions via a common POS device. Thus, intervening information associated with a different transaction may be transmitted from the POS device between the initial and second sets of information for a given transaction. In such situations, the second set of information may include a card identifier (via second card swipe, for example), and that card identifier may be matched with the card identifier from the initial information. In one embodiment, such matching of the card identifier may be constrained by some selected elapsed duration. For example, if the second information is received after the selected duration, the preauthorization may not be considered in determining whether to authorize for the actual purchase amount. Based on the foregoing example, one can see that matching can be achieved in a number of ways.

In some embodiments, authorization based on the actual transaction amount can be based on the preauthorization that already has been performed. Such utilization of preauthorization can simplify and/or speed up the authorization of the actual amount. For example, if the actual amount is less than or equal to the likely amount (for which preauthorization has been performed), authorization may be automatic in one embodiment, once match is achieved. Other circumstances may also qualify for such simplified authorization.

Figure 13:
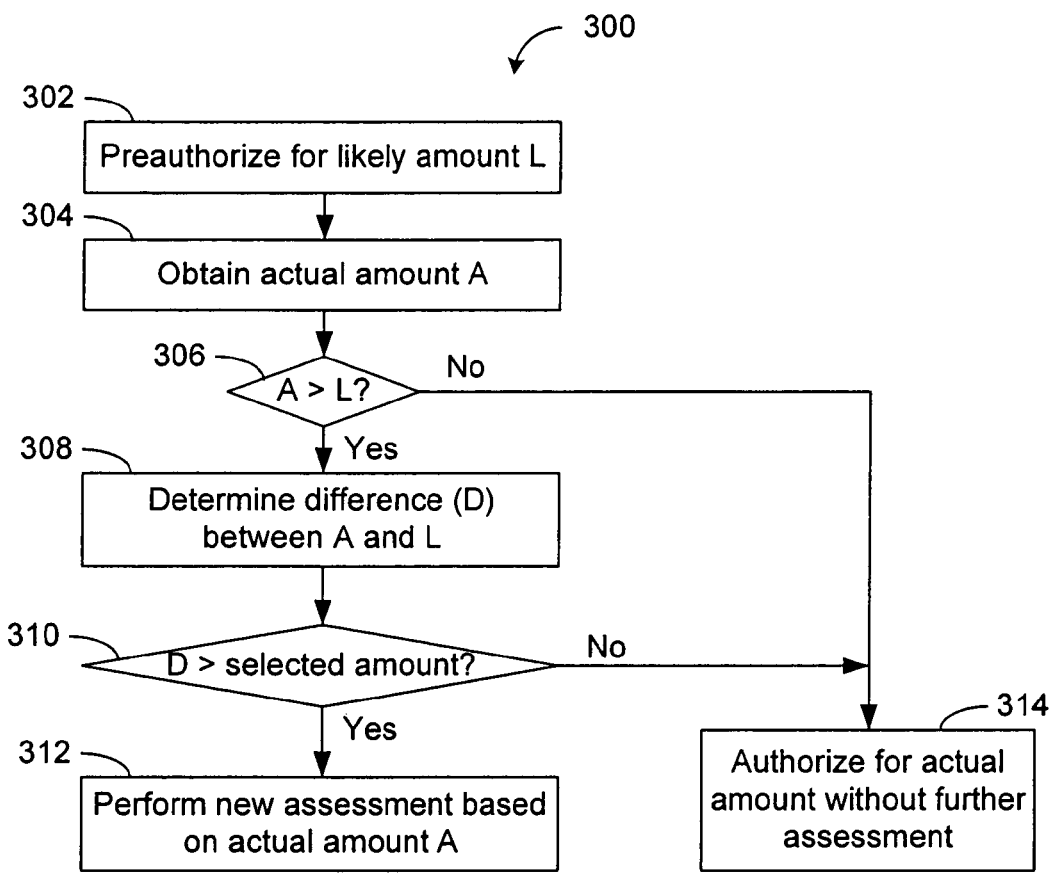
FIG. 13 shows one embodiment of a process configured to allow authorization of the transaction without further assessment if the actual amount is within a selected range of the likely amount that was used for preauthorization.

FIG. 13 shows one embodiment of a process 300 that is configured to base the authorization process on the already-performed preauthorization. For the purpose of describing FIG. 13, it will be assumed that matching has been achieved.

In a process block 302, preauthorization is performed based on a likely transaction amount "L." In a process block 304, the actual amount "A" is obtained. In a decision block 306, the process 300 determines whether the actual amount A is greater than the likely amount L. If the answer is "No," A is less than or equal to L; thus the process 300, in a process block 314, authorizes the transaction for the actual amount A without further assessment.

If the answer is "Yes" in the decision block 306, the process 300 determines the difference "D" between the actual amount A and the likely amount L in a process block 308. In a decision block 310, the process 300 determines whether the difference D is greater than a selected amount. If the answer is "No," the actual amount exceeds the likely amount by less than or equal to the selected amount, and the transaction is authorized for the actual amount without further assessment in the process block 314. If the answer is "Yes," the actual amount exceeds the likely amount by more than the selected amount. The process 312 then performs a new assessment based on the actual amount in determining whether or not the transaction should be authorized.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A method for processing a financial transaction, comprising:
    obtaining, by a check processing service from a merchant, information about a transaction involving a check-related payment to the merchant in exchange for goods or service, said information not having an actual monetary transaction amount, said check-related payment being associated with an account from which funds are to be drawn;
    determining, by the check processing service, a likely monetary transaction amount for said transaction based on said information and at least one of (i) a type of goods or service associated with the merchant, the type of goods or service determined utilizing a merchant identifier included in the information to access a stored merchant profile, or (ii) one or more previous transactions involving the merchant; and
    determining, by the check processing service, whether to allow said transaction based on said likely monetary transaction amount and without placing a hold on said account for said transaction,
    wherein the above steps are performed by one or more computers associated with the check processing service.

2. The method of claim 1, wherein said check-related payment comprises a check payment.

3. The method of claim 2, wherein said check payment comprises an electronic check payment.

4. The method of claim 1, wherein said check-related payment comprises a payment using an automated clearing house card.

5. The method of claim 1, wherein said information is obtained from a point-of-sale device associated with the merchant.

6. The method of claim 1, further comprising pre-authorizing the transaction based on said likely monetary transaction amount.

7. The method of claim 6, wherein said pre-authorizing includes a risk assessment based on said information and said likely monetary transaction amount.

8. The method of claim 6, wherein said pre-authorizing is performed prior to dispensing of said goods or service.

9. The method of claim 6, further comprising obtaining the actual monetary transaction amount.

10. The method of claim 9, wherein said actual monetary transaction amount is obtained after dispensing of said goods or service.

11. The method of claim 9, further comprising associating the pre-authorization with the actual monetary transaction amount.

12. The method of claim 11, wherein the transaction is authorized for the actual monetary transaction amount if said actual monetary transaction amount is associated with the pre-authorization.

13. The method of claim 11, wherein the transaction is authorized for the actual monetary transaction amount if said actual monetary transaction amount is less than or equal to the likely monetary transaction amount.

14. The method of claim 11, wherein the transaction is authorized for the actual monetary transaction amount if said actual monetary transaction amount is greater than the likely monetary transaction amount by a selected amount.

15. The method of claim 14, wherein the selected amount comprises approximately ten percent of the likely monetary transaction amount.

16. The method of claim 11, wherein said associating comprises matching of said information with said actual monetary transaction amount.

17. The method of claim 16, wherein said matching is achieved when said actual monetary transaction amount is obtained during a communication with said merchant after obtaining of said information.

18. The method of claim 17, wherein said matching is achieved when said actual monetary transaction amount is obtained within a predetermined amount of time after obtaining of said information.

19. The method of claim 6, further comprising interacting with said account so as to effectuate said cheek-related payment for the actual monetary transaction amount.

20. The method of claim 19, wherein said interaction with the account occurs in batch along with other similar financial transactions.

21. A system for processing a financial transaction, comprising:
    an interface component configured to obtain, from a merchant, information about a transaction involving a cheek-related payment to the merchant in exchange for goods or service, said information not having an actual monetary transaction amount, said check-related payment being associated with an account from which funds are to be drawn; and
    a processor configured to:
        determine a likely monetary transaction amount for said transaction based on said information and at least one of (i) a type of goods or service associated with the merchant, the type of goods or service determined utilizing a merchant identifier included in the information to access a stored merchant profile, or (ii) one or more previous transactions involving the merchant; and
        determine whether to allow said transaction based on said likely monetary transaction amount and without placing a hold on said account for said transaction.

22. The system of claim 21, wherein said check-related payment comprises a check payment.

23. The system of claim 22, wherein said check payment comprises an electronic check payment.

24. The system of claim 21, wherein said cheek-related payment comprises a payment using an automated clearing house card.

25. The system of claim 21, wherein said information is obtained from a point-of-sale device associated with the merchant.

26. The system of claim 21, wherein said processor is further configured to pre-authorize the transaction based on said likely monetary transaction amount.

27. The system of claim 26, wherein said pre-authorization includes a risk assessment based on said information and said likely monetary transaction amount.

28. The system of claim 26, wherein said pre-authorization is performed prior to dispensing of said goods or service.

29. The system of claim 26, wherein said interface component is further configured to obtain the actual monetary transaction amount.

30. The system of claim 29, wherein said actual monetary transaction amount is obtained after dispensing of said goods or service.

31. The system of claim 29, wherein said processor is further configured to associate the pre-authorization with the actual monetary transaction amount.

32. The system of claim 31, wherein the transaction is authorized for the actual monetary transaction amount if said actual monetary transaction amount is associated with the pre-authorization.

33. The system of claim 31, wherein the transaction is authorized for the actual transaction amount if said actual monetary transaction amount is less than or equal to the likely monetary transaction amount.

34. The system of claim 31, wherein the transaction is authorized for the actual monetary transaction amount if said actual monetary transaction amount is greater than the likely monetary transaction amount by a selected amount.

35. The system of claim 34, wherein the selected amount comprises approximately ten percent of the likely monetary transaction amount.

36. The system of claim 31, wherein said association comprises a match of said information with said actual monetary transaction amount.

37. The system of claim 36, wherein said match is achieved when said actual monetary transaction amount is obtained during a communication with said merchant after obtaining of said information.

38. The system of claim 37, wherein said match is achieved when said actual monetary transaction amount is obtained within a predetermined amount of time after obtaining of said information.

39. The system of claim 26, wherein said interface component is further configured to interact with said account so as to effectuate said check-related payment for the actual monetary transaction amount.

40. The system of claim 39, wherein said interaction with the account occurs in batch along with other similar financial transactions.

* * * * *